(12) United States Patent
Liu et al.

(10) Patent No.: US 11,489,719 B2
(45) Date of Patent: Nov. 1, 2022

(54) CONFIGURATION DEVICE AND METHOD

(71) Applicant: Lenovo (Beijing) Co., Ltd., Beijing (CN)

(72) Inventors: Xiaodong Liu, Beijing (CN); Shuo Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 228 days.

(21) Appl. No.: 16/728,763

(22) Filed: Dec. 27, 2019

(65) Prior Publication Data
US 2020/0213194 A1    Jul. 2, 2020

(30) Foreign Application Priority Data
Dec. 30, 2018    (CN) .......................... 201811644623.7

(51) Int. Cl.
*H04L 41/0806*    (2022.01)
*H04L 41/08*    (2022.01)
*H04W 48/08*    (2009.01)

(52) U.S. Cl.
CPC ...... *H04L 41/0806* (2013.01); *H04L 41/0886* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 9,531,434 B1 * | 12/2016 | Cardama Sierra | H04B 3/54 |
| 2012/0044856 A1 * | 2/2012 | Huang | H04L 41/0809 |
| | | | 370/315 |
| 2013/0063255 A1 | 3/2013 | Washiro | |
| 2014/0181279 A1 * | 6/2014 | Louis | H04W 12/06 |
| | | | 709/222 |
| 2015/0365132 A1 | 12/2015 | Yu | |
| 2017/0034316 A1 * | 2/2017 | Pei | H04W 48/18 |

FOREIGN PATENT DOCUMENTS

| | | |
|---|---|---|
| CN | 1545219 A | 11/2004 |
| CN | 203261513 U | 10/2013 |
| CN | 104714493 A | 6/2015 |
| CN | 108234220 A | 6/2018 |
| CN | 108832967 A | 11/2018 |

\* cited by examiner

*Primary Examiner* — Otis L Thompson, Jr.
(74) *Attorney, Agent, or Firm* — Anova Law Group, PLLC

(57) ABSTRACT

A configuration apparatus includes a processor and a memory. The processor is configured to obtain first data of a first device, the first data indicating that the first device is ready for network configuration. The memory is configured to store network configuration data of a second device. The processor is further configured to: obtain the network configuration data of the second device, and send the network configuration data to the first device, the network configuration data being used to configure the first device to be in a same network connection state as the second device. A power path exists between the first device and the second device, and at least one of the first data or the network configuration data is transmitted through the power path.

20 Claims, 5 Drawing Sheets

CONFIGURATION DEVICE AND METHOD

CROSS-REFERENCE TO RELATED APPLICATION

This application claims priority to Chinese Patent Application No. 201811644623.7, entitled "A CONFIGURATION APPARATUS AND METHOD" filed with the China National Intellectual Property Administration on Dec. 30, 2018, the entire content of which is incorporated herein by reference.

TECHNICAL FIELD

The present disclosure relates to the field of network communication technology and, more particularly, to a configuration method and device/apparatus.

BACKGROUND

In conventional technology, a process for a device to join a network includes: detecting, by the device, nearby networks; selecting, by the device, one of the detected networks; and manually entering, by a user, network configuration data of the selected network into the device so that the device can join the network corresponding to the network configuration data.

SUMMARY

In accordance with the disclosure, there is provided a configuration apparatus including a processor and a memory. The processor is configured to obtain first data of a first device, the first data indicating that the first device is ready for network configuration. The memory is configured to store network configuration data of a second device. The processor is further configured to: obtain the network configuration data of the second device, and send the network configuration data to the first device, the network configuration data being used to configure the first device to be in a same network connection state as the second device. A power path exists between the first device and the second device, and at least one of the first data or the network configuration data is transmitted through the power path.

Also in accordance with the disclosure, there is provided a configuration method. The method includes: obtaining, by a configuration apparatus, first data of a first device, the first data indicating that the first device is ready for network configuration; and obtaining, by the configuration apparatus, network configuration data of s second device. The method also includes sending, by the configuration apparatus, the network configuration data to the first device, the network configuration data being used to configure the first device to be in a same network connection state as the second device. A power path exists between the first device and the second device, and at least one of the first data or the network configuration data is transmitted through the power path.

Also in accordance with the disclosure, there is provided a non-transitory computer readable storage medium storing computer instructions. The computer instructions cause a processor of a configuration apparatus to perform: obtaining first data of a first device, the first data indicating that the first device is ready for network configuration; obtaining network configuration data of s second device; and sending the network configuration data to the first device, the network configuration data being used to configure the first device to be in a same network connection state as the second device. A power path exists between the first device and the second device, and at least one of the first data or the network configuration data is transmitted through the power path.

BRIEF DESCRIPTION OF THE DRAWINGS

In order to more clearly illustrate the technical solutions in embodiments of the present disclosure, drawings used in description of the embodiments will be briefly introduced below. Obviously, these drawings only illustrate some embodiments of the present disclosure. For those of ordinary skill in the art, other drawings can be obtained according to these drawings without inventive efforts.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Figure 1:
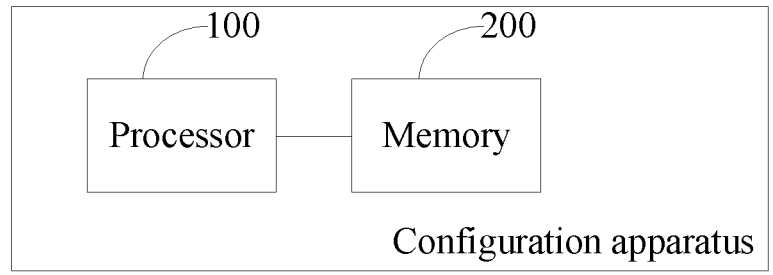
FIG. 1 is a schematic structural diagram of a configuration apparatus according to an example embodiment.

As shown in FIG. 1, an exemplary configuration apparatus or configuration device disclosed herein may include a processor 100 and a memory 200.

The processor 100 is configured to obtain first data from a first device. The first data is configured to indicate that the first device is in a state capable of obtaining network configuration data (e.g., a state of ready for network configuration, a state of seeking network configuration), so as to inform, through the first data, the processor 100 that a network connection can be made for the first device, triggering the processor 100 to perform subsequent operations.

In one embodiment, the first data may include a status identifier. The status identifier is configured to indicate that the first device is in a state of accepting network configuration. In another embodiment, the first data may include a request identifier. The request identifier is configured to indicate that the first device requests network configuration data to be used by the first device for establishing connection to a network.

In some embodiments, the first data may be configured in advance. For example, a content of the first data can be pre-configured at the configuration apparatus. The processor 100 may be configured to, after receiving some data from the first device, determine whether a content of the received data matches with the content of the pre-configured first data. If the content of the received data is the content of the pre-configured first data, it means that the data received by the processor 100 is the first data, so that the processor can determine that the first device is at a state capable of obtaining network configuration data.

In some embodiments, in order to be able to determine whether the content of the received data is the content of the pre-configured first data, the first data can be stored in the memory 200, so that the processor 100 can, after receiving the data from the first device, obtain the first data from the memory 200, and compare the received data and the pre-configured first data to determine whether the currently received data is the first data. In some other embodiments, the processor 100 may obtain the pre-configured first data from other devices.

The memory 200 is configured to store network configuration data of a second device. The network configuration data of the second device includes some configuration parameters of a network joined by the second device. The network configuration data may include an SSID (Service Set Identifier) corresponding to a router and a password corresponding to the router.

In some embodiments, an electric power path (hereinafter power path) exists between the first device and the second device, providing a possibility of data communication between the first device and the second device using the power path. For the data communication and/or data transmission through the power path to work, the second device is a device that is already connected to the network and capable of connecting to the power path, and the first device also has the capability of joining a power path. In one example, the power path connected to the first device and the second device may be the same power path. In another example, the first device and the second device are each connected to two separate power paths, and the two separate power paths are connected via another electronic device or power path.

For example, the second device may be a smart socket that has been connected to the network and is electrically connected to a power path (e.g., a power path goring through the smart socket and AC grid). The first device is a device that is also electrically connected to the power path (e.g., a power path goring through the first device, the second device, and AC grid). In one example, the first device may be plugged into a second device which is a smart socket. In another example, the second device is, like the first device, a device plugged in to a same smart socket. In yet another example, the second device may be a smart socket that is already connected to the network and electrically connected to a first power path. The first device is a device electrically connected to a second power path. The first power path and the second power path are connected through another power path.

The processor 100 is further configured to obtain network configuration data of the second device, and transmit the network configuration data to the first device, so that the first device can be in a same network connection state as the second device according to the network configuration data.

That is to say, when the first device obtains the network configuration data of the second device, the first device can establish a network connection according to the obtained network configuration data. As the second device already has access to a network corresponding to the network configuration data, the first device can establish connection with the network using the network configuration data, and join the same network as the second device.

In some embodiments, the network connected to the second device may change, and the network configuration data of the second device may not be timely changed. When the first device obtains such network configuration data, the first device and the second device may both be in a state of failed network connection. When the network configuration data of the second device is up to date, the first device and the second device can both be in a state of successful network connection.

In some embodiments, the transmissions of the first data and the network configuration data can be achieved in four different modes.

Figure 2:
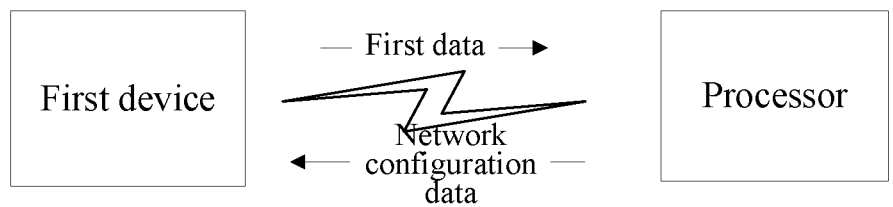
FIG. 2 is a schematic diagram of a data transmission manner according to an example embodiment.

Mode I, the first data and the network configuration data are both transmitted wirelessly. As shown in FIG. 2 the first data and the network configuration data can be transmitted through a wireless network (indicated by a lightening sign in FIG. 2). Specific technology for the wireless transmission may include Wi-Fi and near-field transmission technology such as Bluetooth, which is not limited herein.

Figure 3:
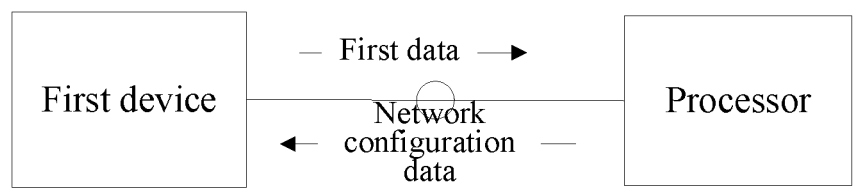
FIG. 3 is a schematic diagram of another data transmission manner according to an example embodiment.

Mode II, the first data and the network configuration data are both transmitted through power path(s). As shown in FIG. 3, the first data and the network configuration data can be respectively transmitted through one or more power paths formed by electric wires (indicated by a sign of a line crossing a circle in FIG. 3).

Figure 4:
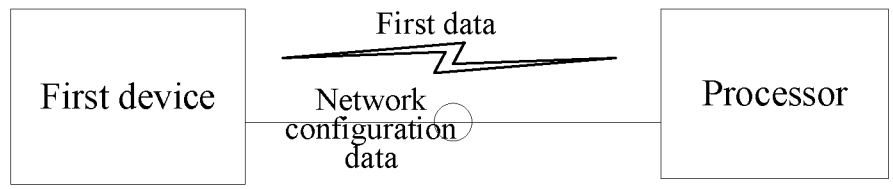
FIG. 4 is a schematic diagram of yet another data transmission manner according to an example embodiment.

Mode III, as shown in FIG. 4, the first data is transmitted wirelessly, and the network configuration data is transmitted through a power path.

Figure 5:
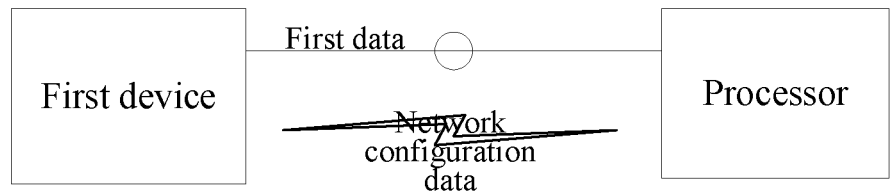
FIG. 5 is a schematic diagram of yet another data transmission manner according to an example embodiment.

Mode IV, as shown in FIG. 5, the first data is transmitted through a power path, and the network configuration data is transmitted wirelessly.

When being transmitted through a power path, the first data and/or the network configuration data may need to be modulated. In one embodiment, the first device is configured to load the first data into a first signal by using a modulation method, and transmit the modulated first signal through the power path. When receiving the modulated first signal, the processor 100 is configured to demodulate the first signal to obtain the first data. In some embodiments, the first signal may be coded pulse signal. Similarly, the processor 100 can be configured to load the network configuration data into a second signal through modulation before transmitting the network configuration data, and transmit the second signal to the first device through the power path, so that the first device can receive and demodulate the second signal to obtain the network configuration data.

In order to achieve modulation and demodulation, a signal conversion chip may be provided in the processor 100. The function of the signal conversion chip is to demodulate the first data from the first signal and load the network configuration data into the second signal by modulation. The specific process of demodulation and modulation is not described herein.

It can be known from the foregoing embodiments that a processor of a device can be configured to obtain a first data from a first device, where the first data is used to indicate that the first device is in a state of capable of receiving network configuration data and/or a state of ready for network configuration. The processor can be further configured to obtain network configuration data of a second device and transmit the network configuration data to the first device, so that the first device can be in the same network connection state as the second device according to the network configuration data. In this way, by transmission of the network configuration parameters from the second device that has been connected to the network to the first device, the first device initially not connected to a network can automatically join a same network as the second device based on the network configuration data. Further, as a power path exists between the first device and the second device, the processor can transmit the network configuration data to the first device through the power path, thereby reducing interference factors to which the network configuration data is subjected, and improving the accuracy of network configuration data transmission.

Figure 6:
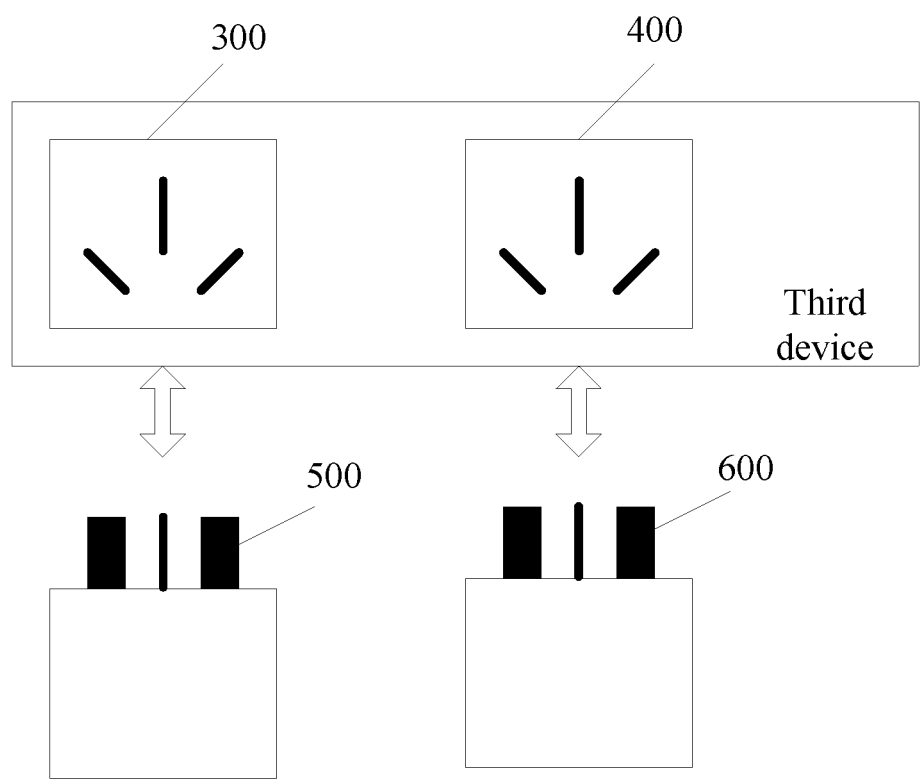
FIG. 6 is a schematic structural diagram of a third device according to an example embodiment.

In some embodiments, the configuration apparatus shown in FIG. 1 may be applied to or operatively coupled to a third device. In some embodiments, the configuration apparatus is the third device. As shown in FIG. 6, the third device and/or the configuration apparatus may include a first electrical interface 300 and a second electrical interface 400. The first electrical interface 300 can be connected to a first connector 500 of the first device (e.g., plug the first connector 500 of the first device to the first electrical interface 300 of the third device), and the second electrical interface 400 can be connected to a second connector 600 of the second device. In this way, there is a power path between the first device and the second device through the third device.

Figure 7:
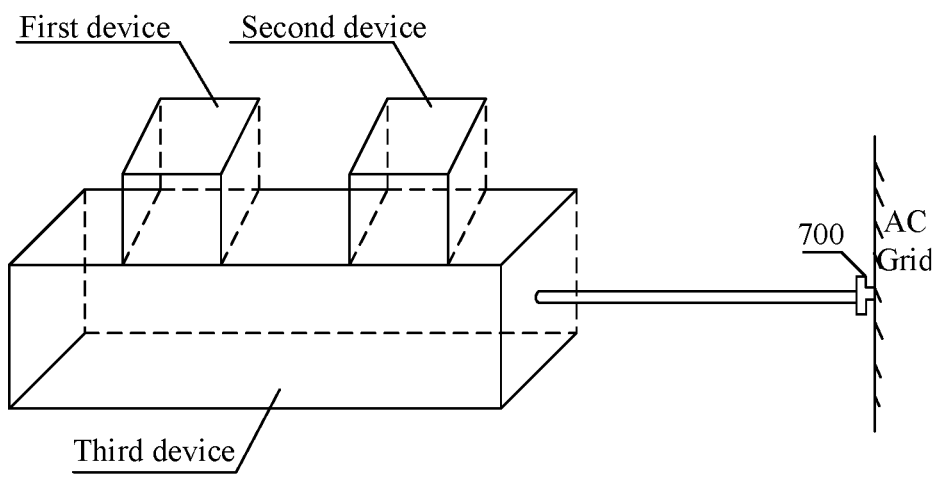
FIG. 7 is a schematic diagram illustrating a transmission of first data and network configuration data through a power path according to an example embodiment.

In some embodiments, the first device can be installed on the third device through the first connector 500 and the first electrical interface 300, and the second device can be installed on the third device through the second connector 600 and the second electrical interface 400. As shown in FIG. 7, the first device and the second device can rely on the third device for data transmission through power path in the electrical circuit.

In some embodiments, the processor of the configuration apparatus/the third device is further configured to communicate with the first electrical interface and the second electrical interface respectively. For example, after the first electrical interface 300 being connected to the first connector 500 of the first device, and the third device being powered on, the processor is configured to receive a first signal containing modulated first data from the first device and send a second signal containing modulated network configuration data to the first device through the first electrical interface 300 and the first connector 500. Further, after the second electrical interface 400 being connected to the second connector 600 of the second device, and the third device being powered on, the processor is configured to receive a third signal containing modulated network configuration data from the second device through the second electrical interface 400 and the second connector 600.

The process in which the first device and the second device rely on the third device to transmit the first data and the network configuration data is described in detail below with reference to FIG. 7. In one embodiment, the first data and the network configuration data are transmitted through the power path, while other transmission methods may be used in another embodiment and is not elaborated herein. In the process of transmitting the first data and network configuration data between the first device and the second device through the power path and the third device, a connector may be used to connect the third device to an AC power grid, such as connector 700 shown in FIG. 7. The connector 700 can be configured to establish connection between the AC power grid and the power path. In this way, AC current can be considered as a transmission carrier for transmitting the signals carrying the first data and the network configuration data through the power path. Two possible processes for transmitting the first data and the network configuration data shown in FIG. 7 are described below.

Process One: the second device loads the network configuration data into a third signal through a modulation method, and transmits the third signal to the third device through a power path. After receiving the third signal, a processor in the third device obtains the network configuration data demodulated from the third signal, and the network configuration data is transmitted to a memory of the third device for storage by any proper internal/local transmission method.

The first device loads/adds the first data into the first signal by modulation, and transmits the first signal to the third device through a power path. After receiving the first signal, the processor in the third device demodulates the first signal to obtain the first data, and determines that the first device is in a state of obtaining network configuration data (e.g., requesting to acquire network configuration data). In response, the processor obtains the network configuration data from the memory, loads the network configuration data into the second signal by modulation, and transmits the second signal to the first device through the power path. The first device receives the second signal, demodulates the network configuration data from the second signal, and establishes network connection based on the network configuration data.

Process two: the first device loads the first data into the first signal through modulation, and transmits the first signal to the third device through a power path. The processor in the third device receives the first signal, demodulate the first signal to obtain the first data, and determines that the first device is in a state of obtaining network configuration data. In response, the processor sends a request for obtaining network configuration data to the second device through a power path.

After receiving the request, the second device loads the network configuration data into the second signal through a modulation method, transmits the second signal to the first device through the power path. The first device receives the second signal, demodulates the network configuration data from the second signal, and establishes network connection based on the network configuration data.

In view of the above, a power path can exist between the first device and the second device through a third device. When the first device is in a state of capable of obtaining network configuration data, the network configuration data can be transmitted from the second device through the power path, so that the first device can be in the same network connection state as the second device according to the network configuration data.

As shown in FIG. 7, in some embodiments, the third device may be a smart socket, and correspondingly, the first device and the second device may be devices that can be plugged into the smart socket. In one example, one of the first and second devices is a socket, and the other is an electronic device. In another example, the first device and the second device are both sockets. In yet another example, the first device and the second device are both electronic devices. With such configuration, when the first device needs to be connected to a network, the first device can be plugged into the smart socket (i.e., the third device). Further, the smart socket already has a second device plugged in, the second device being connected to the network. When the smart socket is connected to the AC power grid, the first device can obtain the network configuration data from the second device through the power path, automatically completing connection to the network. By plugging in both the first and second devices into the third device which enables the first device to be configured to have a same network connection state as the second device, not only the network configuration process is simplified and operation efficiency is improved, but also a good operation experience is provided. Further, the problem of identifying one to-be-connected network from multiple possible networks in wireless network environment can be resolved. In other words, upon determining which second device should be used to configure network connection of the first device, the first device can join the same network as the second device by just maintaining a power path between the first device and the determined second device.

Figure 8:
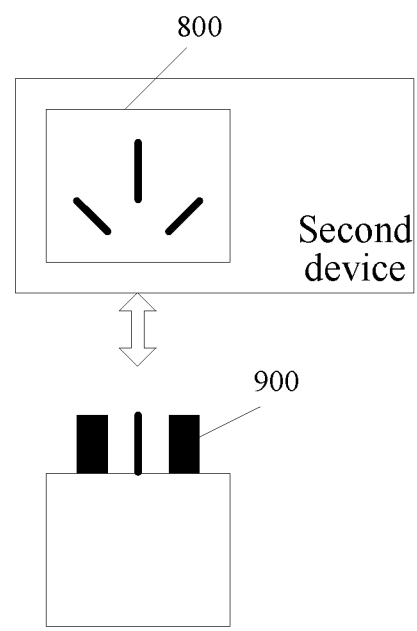
FIG. 8 is a schematic structural diagram of a second device according to an example embodiment.

In some embodiments, the configuration apparatus shown in FIG. 1 may be applied to or operatively coupled to a second device. In some embodiments, the configuration apparatus is the second device. As shown in FIG. 8, the second device and/or the configuration apparatus may further include a third electrical interface 800. The third electrical interface 800 can be connected to a third connector 900 of the first device, enabling a power path between the first device and the second device. In some embodiments, the third connector 900 of the first device may be the same connector as the first connector 500 of the first device.

In some embodiments, the processor of the configuration apparatus/the second device is further configured to communicate with the third electrical interface 800. For example, after the third electrical interface 800 being connected to the third connector 900 of the first device, and the second device being powered on, the processor is configured to receive a first signal containing modulated first data from the first device and send a second signal containing modulated network configuration data to the first device through the third electrical interface 800 and the third connector 900.

Figure 9:
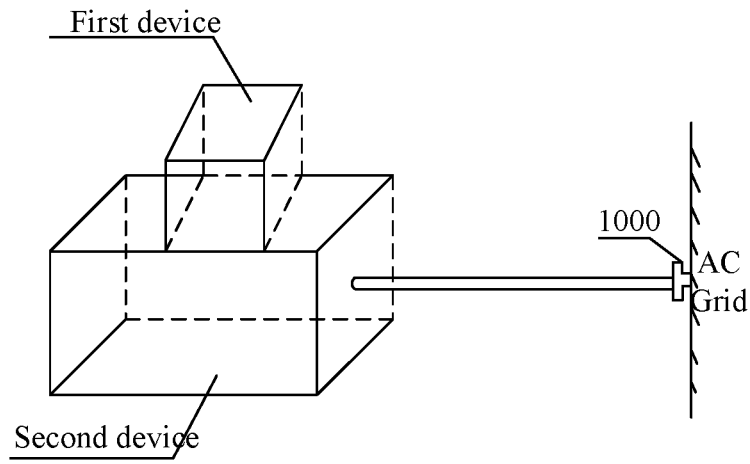
FIG. 9 is a schematic diagram illustrating another transmission of first data and network configuration data through a power path according to an example embodiment.

In some embodiments, as shown in FIG. 9, the first device may be installed on the second device through the third connector 900 and the third electrical interface 800. After the first device is installed on the second device, the first device and the second device can perform data transmission through the power path. Such data transmission may require a connector to connect the second device with an AC power grid, such as connector 1000 shown in FIG. 10. Through connector 1000, the power path between the first and second devices can conduct power from the AC grid. In this way, the signal(s) carrying the first data and/or the network configuration data can use the alternating electric current as a transmission carrier for transmission on the power path. An exemplary process of transmitting the first data and the network configuration data, with reference to FIG. 9, is as follows:

The first device loads the first data into the first signal in a modulation manner, and transmits the first signal to the second device through a power path. After receiving the first signal, the processor in the second device demodulates the first signal to obtain the first data, and determines that the first device is in a state of obtaining network configuration data (e.g., requesting to acquire network configuration data). In response, the processor of the second device obtains the network configuration data from the memory, loads the network configuration data into the second signal by modulation, and transmits the second signal to the first device through the power path. The first device receives the second signal, demodulates the network configuration data from the second signal, and establishes network connection based on the network configuration data, thereby achieving transmission of the first data and the network configuration data based on the power path.

In some embodiments, the second device may be a smart socket, and correspondingly, the first device may be a device capable of being plugged into the smart socket. For example, the first device may be a socket or an electronic device that can be plugged into the smart socket. When the first device needs to connect to the network, a user can plug the first device into the smart socket which functions as the second device, and connect the smart socket to the AC power grid. The first device can then obtain the network configuration data through the power path and automatically complete connection to the network. By plugging the first device into the second device to configure the first device to have the same network connection state as the second device, not only the network configuration process is simplified and operation efficiency is improved, but also a good operation experience is provided. Further, the problem of identifying one to-be-connected network from multiple possible networks in wireless network environment can be resolved. In other words, upon determining which second device should be used to configure network connection of the first device, the first device can join the same network as the second device by just maintaining a power path between the first device and the determined second device.

It should be noted that, the power path in the disclosed embodiments does not refer to any general path between two devices in the AC power grid, but is a power path in a specific environment and/or circuit. Specifically, the power path, as used herein, may refer to electrical connection path between devices that have direct or indirect physical contact, such as the electrical connection between the second device and the first device which have direct physical contact as shown in FIG. 9, or the electrical connection between the second device and the first device which have indirect physical contact through the third device as shown in FIG. 7.

Figure 10:
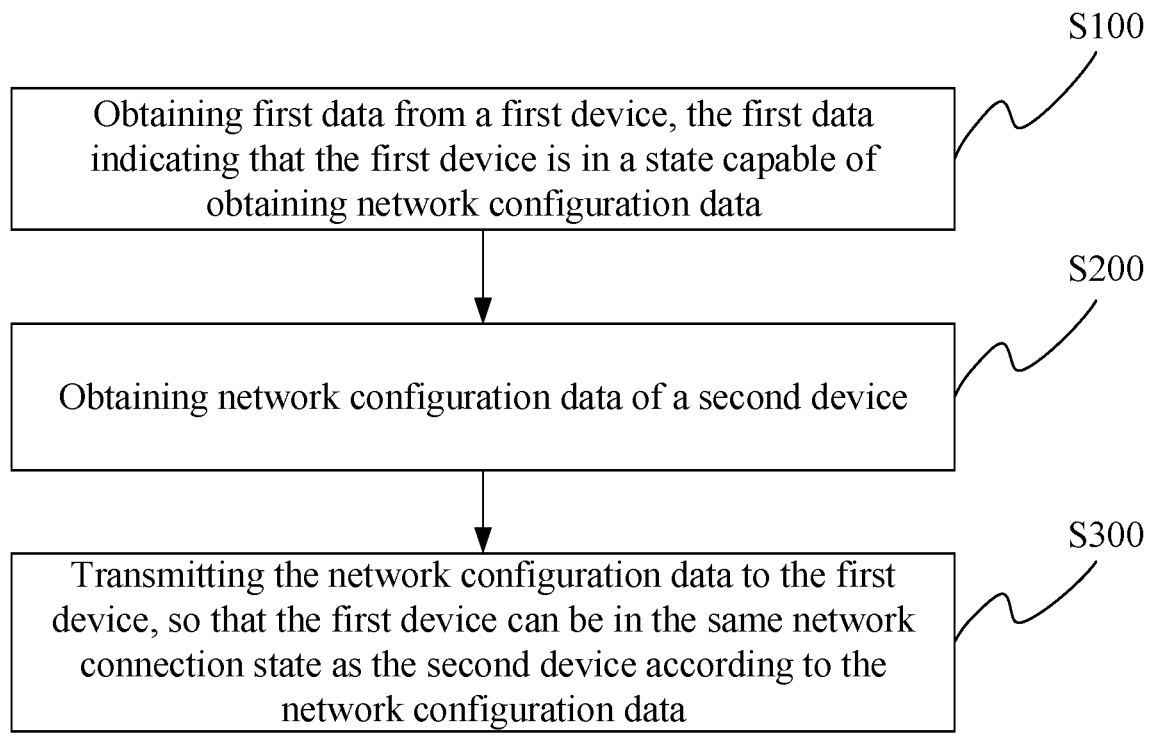
FIG. 10 is a flow chart of a configuration process according to an example embodiment.

Corresponding to the foregoing apparatus embodiments, the present disclosure further provides a configuration method, as shown in FIG. 10, which may include the following steps.

S100: Obtaining first data from a first device, where the first data indicates that the first device is in a state capable of obtaining network configuration data, so as to notify, by using the first data, that a network connection can be made for the first device, thereby triggering subsequent operations. In one embodiment, the first data may include a status identifier, which is used to indicate that the first device is in a state of being enabled to obtain network configuration data. In another embodiment, the first data may include a request identifier, which is used to indicate that the first device requests network configuration data to be used to be used by the first device for establishing connection to a network.

In some embodiments, the first data may be configured in advance. For example, a content of the first data can be pre-configured (e.g., at the configuration apparatus). After receiving some data from the first device, it is determined that whether a content of the received data matches with the content of the pre-configured first data. If the content of the received data is the content of the pre-configured first data, it means that the received data is the first data, so that it can be determined that the first device is at a state capable of obtaining network configuration data.

S200. Obtaining network configuration data of a second device. The network configuration data of the second device includes some configuration parameters of a network joined by the second device. The network configuration data may include an SSID (Service Set Identifier) and a password corresponding to a router. A power path exists between the first device and the second device, so that the first device and the second device can transmit data through the power path.

S300: Transmitting the network configuration data to the first device, so that the first device can be in the same network connection state as the second device according to the network configuration data. That is to say, if the first device obtains the network configuration data of the second device, the first device can establish a network connection according to the obtained network configuration data. As the second device already has access to a network corresponding to the network configuration data, when the first device establishes connection with a network using the network configuration data, the first device can be in the same network connection state as the second device.

In some embodiments, the network connected to the second device may change, and the network configuration data of the second device may not be timely changed. When the first device obtains such network configuration data, the first device and the second device may both be in a state of failed network connection. When the network configuration data of the second device is up to date, the first device and the second device can both be in a state of successful network connection.

In some embodiments, at least one of the first data and the network configuration data is transmitted through a power path. In some embodiments, possible transmission of these two types of data can be achieved in four different modes.

Mode I, the first data and the network configuration data are both transmitted wirelessly.

Mode II, the first data and the network configuration data are both transmitted through power path(s).

Mode III, the first data is transmitted wirelessly, and the network configuration data is transmitted through a power path.

Mode IV, the first data is transmitted through a power path, and the network configuration data is transmitted wirelessly.

When transmitting at least one of the first data and the network configuration data through a power path, modulation of such data needs to be performed. Using transmitting both the first data and the network configuration data through power path(s) as an example (Mode II), the transmission process may include the following. The first device loads the first data into a first signal by using a modulation method, and transmits the modulated first signal through the power path. When receiving the modulated first signal, an apparatus that implements the disclosed method (e.g., the configuration apparatus described above) demodulates the first signal to obtain the first data. Further, the apparatus obtains the network configuration data of the second device, loads the network configuration data into a second signal through modulation, and transmit the modulated second signal to the first device through the power path, so that the first device can receive and demodulate the second signal to obtain the network configuration data.

It can be known from the foregoing embodiments that, when a first data is obtained from a first device, the first data indicating that the first device is in a state of capable of receiving network configuration data, the network configuration data of a second device can be obtained and transmitted to the first device, so that the first device can be in the same network connection state as the second device according to the network configuration data. In this way, by transmission of the network configuration parameters from the second device that has already been connected to the network to the first device, the first device initially not connected to a network can automatically join a same network as the second device based on the network configuration data. Further, as a power path exists between the first device and the second device, the network configuration data can be transmitted to the first device through the power path, thereby reducing interference factors to which the network configuration data is subjected, and improving the accuracy of network configuration data transmission.

Figure 11:
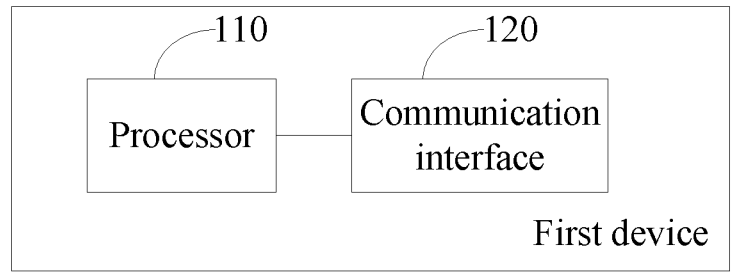
FIG. 11 is a schematic structural diagram of a first device according to an example embodiment.

The present disclosure further discloses a first device, a structural diagram of which as shown in FIG. 11, including: a processor 110 and a communication interface 120.

The processor 110 is configured to obtain first data, where the first data is used to indicate that the first device is in a state of capable of obtaining network configuration data. In one embodiment, the first data may include a status identifier, which is used to indicate that the first device is in a state of looking for network configuration data. In another embodiment, the first data may include a request identifier, which is used to indicate that the first device requests to obtain network configuration data for connecting to a network.

In some embodiments, the processor 110 may be configured to obtain the first data from a memory in the first device, or obtain the first data from an apparatus other than the first device through a wireless transmission method such as Bluetooth. The first data may be configured in advance, such as pre-configuring a content in the first data.

The communication interface 120 is configured to send the first data and receive the network configuration data of the second device. A power path exists between the first device and the second device, so that the first device and the second device can communicate data through the power path. For example, at least one of the first data and the network configuration data is transmitted through the power path, and the first device sends the first data through the communication interface 120 after the first device is powered on. The reason for sending after the power on is: the power path can only work when having a carrier that transmits the first data-AC power.

In order to be able to transmit the first data through the power path, in some embodiments, after the processor 110 obtains the first data, the processor 110 is further configured to load the first data in the first signal through a modulation method, and transmits the first signal through the power path. Correspondingly, the network configuration data of the second device also needs to be loaded into the second signal before it can be transmitted through the power path. Accordingly, after the communication interface 120 receives the second signal and transmits the second signal to the processor 110, the processor 110 is configured to demodulate the network configuration data from the second signal before using the network configuration data.

The processor 110 is further configured to configure the first device according to the network configuration data, so that the first device can be in the same network connection state as the second device according to the network configuration data.

For example, the processor 110 configures the first device according to the network configuration data (such as SSID and password of a router), so that the first device connects to the network using the same network configuration data of the second device, which is equivalent to the first device automatically connecting to the network. There is no need for a user of the first device to search for the SSID of the specific router (e.g., among a list of SSIDs), and no need to manually enter a password corresponding to the SSID of the router.

In some embodiments, the network connected to the second device may change, and the network configuration data of the second device may not be timely changed. When the first device obtains such network configuration data, the first device and the second device may both be in a state of failed network connection. When the network configuration data of the second device is up to date, the first device and the second device can both be in a state of successful network connection.

It can be known from the foregoing embodiments that, by sending a first data of a first data which indicates that the first device is in a state of capable of receiving network configuration data, the network configuration data of a second device can be obtained. The processor of the first device can configure the first device according to the network configuration data, so that the first device can be in the same network connection state as the second device. In this way, by transmission of the network configuration parameters from the second device that has already been connected to the network to the first device, the first device initially not connected to a network can automatically join a same network as the second device based on the network configuration data. Further, as a power path exists between the first device and the second device, the network configuration data can be transmitted to the first device through the power path, thereby reducing interference factors to which the network configuration data is subjected, and improving the accuracy of network configuration data transmission.

Figure 12:
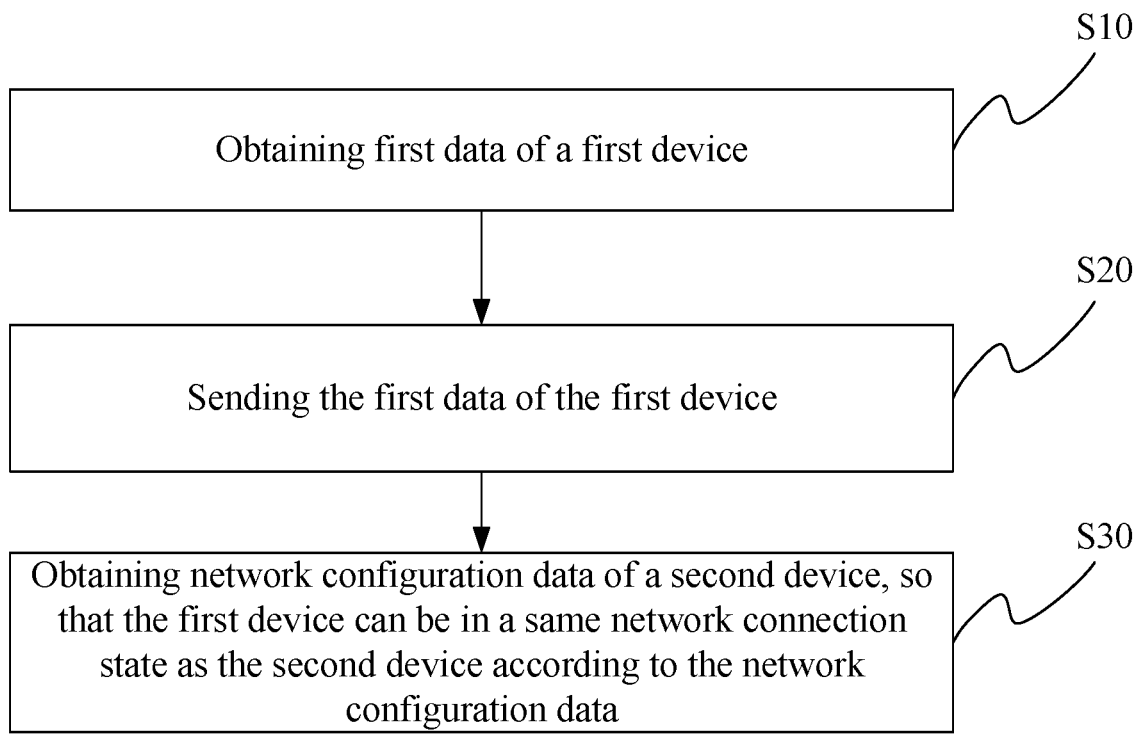
FIG. 12 is a flow chart of another configuration process according to an example embodiment.

Corresponding to the foregoing apparatus embodiments, the present disclosure further provides a configuration method, as shown in FIG. 12, which may include the following steps.

S10: obtaining first data of a first device, the first data indicating that the first device is in a state of acquiring network configuration.

S20: sending the first data of the first device.

S30: obtaining network configuration data of a second device, so that the first device can be in a same network connection state as the second device according to the network configuration data.

In some embodiments, at least one of the first data and the network configuration data is transmitted through a power path. In some embodiments, possible transmission of these two types of data can be achieved in four different modes.

Mode I, the first data and the network configuration data are both transmitted wirelessly.

Mode II, the first data and the network configuration data are both transmitted through power path(s).

Mode III, the first data is transmitted wirelessly, and the network configuration data is transmitted through a power path.

Mode IV, the first data is transmitted through a power path, and the network configuration data is transmitted wirelessly.

When the first data and the network configuration data are both transmitted through the power path, the sending the first data of the first device may include: loading the first data into a first signal through modulation, send the first signal through the power patch. Further, obtaining the network configuration data of the second device may include: demodulating a second signal transmitted through the power path to obtain the network configuration data. Further, alternating current is the carrier of data communication on the power path. The sending of the first data is performed after detecting that the first device is powered on. In this way, the carrier of the power path (i.e., alternating current) can be used to transmit the first signal containing the first data and/or the second signal containing the network configuration data.

It can be known from the foregoing embodiments that, by sending a first data of a first data which indicates that the first device is in a state of capable of receiving network configuration data, the network configuration data of a second device can be obtained. The processor of the first device can configure the first device according to the network configuration data, so that the first device can be in the same network connection state as the second device. In this way, by transmission of the network configuration parameters from the second device that has already been connected to the network to the first device, the first device initially not connected to a network can automatically join a same network as the second device based on the network configuration data. Further, as a power path exists between the first device and the second device, the network configuration data can be transmitted to the first device through the power path, thereby reducing interference factors to which the network configuration data is subjected, and improving the accuracy of network configuration data transmission.

It should be noted that, embodiments in this specification are described in a progressive manner. Each embodiment focuses on difference from other embodiments, and the same or similar parts among the embodiments of the present disclosure can be referred to each other. As apparatus embodiments are basically similar to method embodiments, their descriptions are relatively simple, and readers can refer to corresponding descriptions of method embodiments for relevant contents.

Finally, it should also be noted that in the present disclosure, relational terms such as first and second, etc., are only used to distinguish one entity or operation from another entity or operation, but do not necessarily require and imply that there is any such actual relationship or sequence between these entities or operations. Moreover, terms "include", "including" or any other variations thereof are intended to cover non-exclusive inclusions such that a process, a method, an article, or a terminal device that includes a series of elements includes not only those elements but also includes unspecified elements or elements inherent in such process, method, article or terminal device. In the case of no more limitation, an element defined by a sentence "include one . . . " does not exclude that there is another same element in the process, the method, the article, or the terminal device that includes the element.

The above description of the disclosed embodiments enables those skilled in the art to implement or use the present application. Various modifications to these embodiments will be apparent to those skilled in the art, and the general principles defined herein may be implemented in other embodiments without departing from the spirit or scope of the application. Therefore, this application will not be limited to the embodiments shown herein, but should conform to the widest scope consistent with the principles and novel features disclosed herein.

It should be noted that for those of ordinary skill in the art, without departing from the principles of the present application, improvements and modifications can be made, and such improvements and modifications should also be considered as the scope of protection of this application.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A configuration apparatus, comprising:
a processor, configured to obtain first data of a first device, the first data indicating that the first device is ready for network configuration;
a memory, configured to store network configuration data of a second device;
wherein:
the processor is further configured to: obtain the network configuration data of the second device, and send the network configuration data to the first device, the network configuration data being used to configure the first device to be in a same network connection state as the second device, the first device and the second device being both connected in a same network, and the second device being in the network before the first device; and
a power path exists between the first device and the second device, and at least one of the first data or the network configuration data is transmitted through the power path.

2. The apparatus according to claim 1, wherein:
the apparatus is operatively coupled to a third device;
the apparatus further comprises a first electrical interface configured to connect to a first connector of the first device, and a second electrical interface configured to connect to a second connector of the second device, wherein the power path exists between the first device and the second device through the third device; and
the processor is further configured to communicate with the first electrical interface and the second electrical interface respectively.

3. The apparatus according to claim 2, wherein the processor is further configured to:
obtain a first signal from the first device transmitted through the power path between the first electrical interface and the first connector of the first device, the first signal being generated by modulating the first data; and
send a second signal to the first device through the power path between the first electrical interface and the first connector of the first device, the second signal being generated by modulating the network configuration data of the second device.

4. The apparatus according to claim 2, wherein the processor is further configured to:
demodulate a third signal received from the second device through the power path between the second electrical interface and the second connector of the second device, to obtain the network configuration data; and
store the network configuration data of the second device in the memory.

5. The apparatus according to claim 1, wherein:
the apparatus is operatively coupled to the second device;
the apparatus further comprises a third electrical interface configured to connect to a third connector of the first device; and
the processor is further configured to communicate with the third electrical interface.

6. The apparatus according to claim 5, wherein the processor is further configured to:
receive a first signal from the first device through the power path between the first electrical interface and the third connector of the first device, the first signal being generated by modulating the first data;
obtain the network configuration data of the second device from the memory; and
send a second signal to the first device through the power path between the first electrical interface and the third connector of the first device, the second signal being generated by modulating the network configuration data of the second device.

7. The apparatus according to claim 1, wherein the processor is further configured to obtain one of the first data and the network configuration data wirelessly.

8. The apparatus according to claim 1, wherein:
the apparatus is a smart socket.

9. A configuration method, comprising:
obtaining, by a configuration apparatus, first data of a first device, the first data indicating that the first device is ready for network configuration;
obtaining, by the configuration apparatus, network configuration data of a second device; and
sending, by the configuration apparatus, the network configuration data to the first device, the network configuration data being used to configure the first device to be in a same network connection state as the second device, the first device and the second device being both connected in a same network, and the second device being in the network before the first device,
wherein a power path exists between the first device and the second device, and at least one of the first data or the network configuration data is transmitted through the power path.

10. The method according to claim 9, further comprising:
obtaining a first signal from the first device transmitted through the power path;
demodulating the first signal to obtain the first data;
modulating the network configuration data of the second device to obtain a second signal; and
sending the second signal to the first device through the power path.

11. The method according to claim 10, wherein:
the configuration apparatus is operatively coupled to a third device, and the power path between the first device and the second device is enabled through respective connection of the first and second devices with the third device.

12. The method according to claim 11, further comprising:
demodulating a third signal received from the second device through the power path, to obtain the network configuration data of the second device.

13. The method according to claim 9, wherein the configuration apparatus is operatively coupled to the second device, and the method further comprises:
obtaining the network configuration data of the second device from a memory of the configuration apparatus.

14. The method according to claim 9, further comprising:
obtaining one of the first data and the network configuration data wirelessly.

15. A non-transitory computer readable storage medium storing computer instructions that cause a processor of a configuration apparatus to perform:

obtaining first data of a first device, the first data indicating that the first device is ready for network configuration;

obtaining network configuration data of s second device; and sending the network configuration data to the first device, the network configuration data being used to configure the first device to be in a same network connection state as the second device, the first device and the second device being both connected in a same network, and the second device being in the network before the first device, wherein a power path exists between the first device and the second device, and at least one of the first data or the network configuration data is transmitted through the power path.

16. The storage medium according to claim 15, wherein the computer instructions further cause the processor to perform:

obtaining a first signal from the first device transmitted through the power path;

demodulating the first signal to obtain the first data;

modulating the network configuration data of the second device to obtain a second signal; and sending the second signal to the first device through the power path.

17. The storage medium according to claim 16, wherein:

the configuration apparatus is operatively coupled to a third device, and the power path between the first device and the second device is enabled through respective connection of the first and second devices with the third device.

18. The storage medium according to claim 17, wherein the computer instructions further cause the processor to perform:

demodulating a third signal received from the second device through the power path, to obtain the network configuration data of the second device.

19. The storage medium according to claim 15, wherein the configuration apparatus is operatively coupled to the second device, and the computer instructions further cause the processor to perform:

obtaining the network configuration data of the second device from a memory of the configuration apparatus.

20. The storage medium according to claim 15, wherein the computer instructions further cause the processor to perform:

obtaining one of the first data and the network configuration data wirelessly.

* * * * *